United States Patent
DeWeert et al.

(10) Patent No.: US 9,476,700 B2
(45) Date of Patent: Oct. 25, 2016

(54) PHASE RESOLVED SHEAROGRAPHY FOR REMOTE SENSING

(71) Applicant: BAE Systems Information and Electronic Systems Integration Inc., Nashua, NH (US)

(72) Inventors: Michael J. DeWeert, Kailua, HI (US); Andrew N. Acker, Honolulu, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 93 days.

(21) Appl. No.: 14/538,444

(22) Filed: Nov. 11, 2014

(65) Prior Publication Data

US 2015/0338208 A1    Nov. 26, 2015

Related U.S. Application Data

(60) Provisional application No. 61/902,970, filed on Nov. 12, 2013.

(51) Int. Cl.
*G01B 11/16* (2006.01)
*G01S 17/88* (2006.01)
*G01V 1/22* (2006.01)

(52) U.S. Cl.
CPC ............. *G01B 11/162* (2013.01); *G01S 17/88* (2013.01); *G01V 1/226* (2013.01)

(58) Field of Classification Search
CPC .............. G01B 11/161; G01B 11/162; G01B 9/02094; G01B 9/02095; G01B 9/02098
USPC ........................................................ 356/520
See application file for complete search history.

(56) References Cited

U.S. PATENT DOCUMENTS

| | | | |
|---|---|---|---|
| 6,040,900 A | 3/2000 | Chen | |
| 6,584,215 B1 * | 6/2003 | Mahner ................ | G01B 11/162 382/108 |
| 6,717,681 B1 | 4/2004 | Bard et al. | |
| 8,553,233 B2 | 10/2013 | Newman | |
| 8,596,128 B2 | 12/2013 | Kurtz | |
| 8,717,577 B1 | 5/2014 | Kokobun et al. | |
| 8,804,132 B1 | 8/2014 | Saxer | |
| 8,873,068 B2 | 10/2014 | Blain et al. | |
| 2001/0040682 A1 * | 11/2001 | Lindsay ................ | G01B 9/025 356/520 |
| 2013/0003152 A1 * | 1/2013 | Belousov ............. | G01B 11/162 359/9 |

* cited by examiner

*Primary Examiner* — Jonathan Hansen
(74) *Attorney, Agent, or Firm* — Sand & Sebolt, LPA; Daniel J. Long

(57) ABSTRACT

A shearography system and method provide advances allowing for rapid processing to produce shearograms which provide surface motion information which may be helpful in multiple fields. For instance, amongst virtually endless possibilities, the system and method may allow for detection of underground structures or ordnance and or be used in the medical field to provide non-contact sensing of a person's internal structures or movements.

19 Claims, 5 Drawing Sheets

US 9,476,700 B2

PHASE RESOLVED SHEAROGRAPHY FOR REMOTE SENSING

CROSS-REFERENCE TO RELATED APPLICATION

This application claims priority from U.S. Provisional Application Ser. No. 61/902,970, filed Nov. 12, 2013, the disclosure of which is incorporated herein by reference.

STATEMENT OF GOVERNMENT INTEREST

The invention was made with the United States Government assistance under Contract No. W909MY-11-C-0074 awarded by the Department of the Army and Contract No. N00014-07-C-0292 awarded by the Department of the Navy. The United States Government has certain rights in this invention.

BACKGROUND OF THE INVENTION

1. Technical Field

The present invention relates to remote sensing and more particularly to phase resolved shearography for remote sensing.

2. Background Information

The prior art discloses various means for detecting buried objects, for instance, non-phase resolved (NPR) shearography and laser doppler vibrometry. Non-phase resolved shearography is unable to resolve the phase of an acousto-seismic signal and requires the use of high power laser sources. This limitation means that (a) inversion methods cannot be applied to the output to identify scattering sources or targets of interest in the acousto-seismic signal, and (b) this type of system is impractical for aircraft and other fast moving platforms that require large area coverage rates.

There is a need, however, to remotely measure the full phase and amplitude information of small scale acousto-seismic vibrations in order to detect the presence of buried objects (e.g. mines, tunnels etc.) or for other purposes. This remote sensing information may need to be collected with a large area coverage rate and at a safe standoff distance.

In shearography, a target surface, part or area being observed is illuminated by an expanding laser beam, and two time sequential images are captured of the target surface, part or area with an image-shearing camera. The first image is taken of the surface, and the second image is taken of the same surface a short time thereafter during deformation or loading of the surface. The two images taken are processed together to produce a third image (a shearogram) showing a fringe pattern that depicts the gradient of the displacement of the surface due to some loading of the surface between the first and second images.

More particularly, shearography is an optical measuring technique using coherent light for the interferometric observation of the surfaces typically under non-destructive thermal or mechanical loading to distinguish between structural information and anomalies of the surfaces or parts due to loading such as thermal or mechanical loading. The two images are each laterally displaced images taken of the surface of the part being observed and the two images are coherently superposed. The lateral displacement is called the shear of the images. The superposition of the two images is called a shearogram, which is an interferogram of an object wave with the sheared surface wave as a reference wave.

The absolute difference of two shearograms recorded at different physical loading conditions of the target surface, part or area is an interference fringe pattern which is directly correlated to the difference in the deformation state of the target area between taking the two images thereof. In contrast to holographic interferometry, the fringe pattern indicates the slope of deformation rather than the deformation itself. Defects inside the target part will affect the local surface deformation induced by the loading and result in a disturbance of the loading fringes that are detected.

The resultant difference images always exhibit a very noisy structure. This is due to what are called speckles. Speckles are statistical interference patterns which occur after reflection of a coherent wave off a rough surface, giving the image a grainy structure. Regarding shearography, the speckles are the carrier of information, coding the wave field and surface state information respectively and giving rise to interference fringe patterns. However, the grainy nature of the speckles is conserved and significantly decreases contrast and signal to noise ratio of the difference images.

The difference images typically exhibit strong noise and low contrast that require further image processing. This further image processing can be either image improvement or image evaluation. The goal is to remove speckle noise and to increase fringe contrast in order to improve the visibility of the fringes.

U.S. Pat. No. 8,717,577 (incorporated in full herein by reference) provides a method of collecting shearography data for a subject target from a moving platform, such as an aircraft, surface craft, handheld device or moving vehicle. In short, said patent provides a process in which, during movement of the moving platform, two onboard laser transmitters and an onboard optical receiver are operated in a manner that they appear to be stationary. To capture the pair of images (specklegrams) required for shearography, the first laser transmitter transmits a first laser pulse toward the ground while positioned at an angle with respect to the ground. The resulting first ground image is captured by the optical receiver. A very short time thereafter, a second laser transmitter transmits a second laser pulse toward the ground at the same angle. This occurs because the position of the second laser transmitter has been adjusted according to the speed of the moving platform so that during the time between the first and second laser pulse transmissions, the second laser transmitter has moved a distance by the motion of the aircraft or other moving platform so that the second laser transmitter is at the same position during the second laser transmission that the first laser transmitter was during the first laser transmission.

The present method addresses the above-noted need and provides improvements which may be used in conjunction with the method of the above-noted U.S. Pat. No. 8,717,577. The present system and method may also be used in a variety of other contexts, as noted further below.

SUMMARY

In one aspect, the invention may provide a method comprising the steps of reflecting sequentially off of a target surface first, second and third laser beams so that the first laser beam is reflected off of the target surface when the target surface is under a first load to produce a first reflected laser beam image; the second laser beam is reflected off of the target surface when the target surface is under a second load which is different from the first load to produce a second reflected laser beam image; and the third laser beam is reflected off of the target surface when the target surface is under a third load which is different from each of the first and second loads to produce a third reflected laser beam image; phase stepping the first, second and third reflected laser beam images with a shearing interferometer to respective phases $\theta_1$, $\theta_2$ and $\theta_3$ of a laser beam wavelength; collecting with shearography equipment first, second and third specklegrams of the target surface based respectively on the first, second and third reflected laser beam images; and comparing the first, second and third specklegrams to one another to produce a first shearogram to ascertain surface changes of the target surface.

In another aspect, the invention may provide a method comprising the steps of reflecting sequentially off of a target surface first, second, third and fourth laser beams to respectively produce first, second, third and fourth reflected laser beam images; phase stepping the first, second, third and fourth reflected laser beam images with a shearing interferometer to respective phases $\theta_1$, $\theta_2$, $\theta_3$ and $\theta_4$ of a laser beam wavelength, wherein $\cos\theta_1 = \cos\theta_4$ and $\cos\theta_2 = \cos\theta_3$; collecting with shearography equipment first, second, third and fourth specklegrams of the target surface based respectively on the first, second, third and fourth reflected laser beam images; and comparing the first, second, third and fourth specklegrams to one another to produce a shearogram to ascertain surface changes of the target surface; wherein the shearogram is based on a phase resolved shearogram equation $Shear_{PR\_1}$ expressed as a ratio of differences of specklegrams:

$$Shear_{PR\_1} = \frac{[(s4) - (s1)]}{[(s2) - (s3)]}$$

wherein the first specklegram is represented by (s1), the second specklegram is represented by (s2), the third specklegram is represented by (s3) and the fourth specklegram is represented by (s4).

In another aspect, the invention may provide a method comprising the steps of reflecting sequentially off of a target surface first, second, third and fourth laser beams to respectively produce first, second, third and fourth reflected laser beam images; phase stepping the first, second, third and fourth reflected laser beam images with a shearing interferometer to respective phases $\theta_1$, $\theta_2$, $\theta_3$ and $\theta_4$ of a laser beam wavelength; collecting with shearography equipment first, second, third and fourth specklegrams of the target surface based respectively on the first, second, third and fourth reflected laser beam images; comparing the first, second and third specklegrams to one another to produce a first shearogram to ascertain surface changes of the target surface; and comparing the fourth specklegram and at least two of the first, second and third specklegrams to one another to produce a second shearogram to ascertain surface changes of the target surface.

BRIEF DESCRIPTION OF THE SEVERAL VIEWS OF THE DRAWINGS

Similar numbers refer to similar parts throughout the drawings.

DETAILED DESCRIPTION

Figure 1:
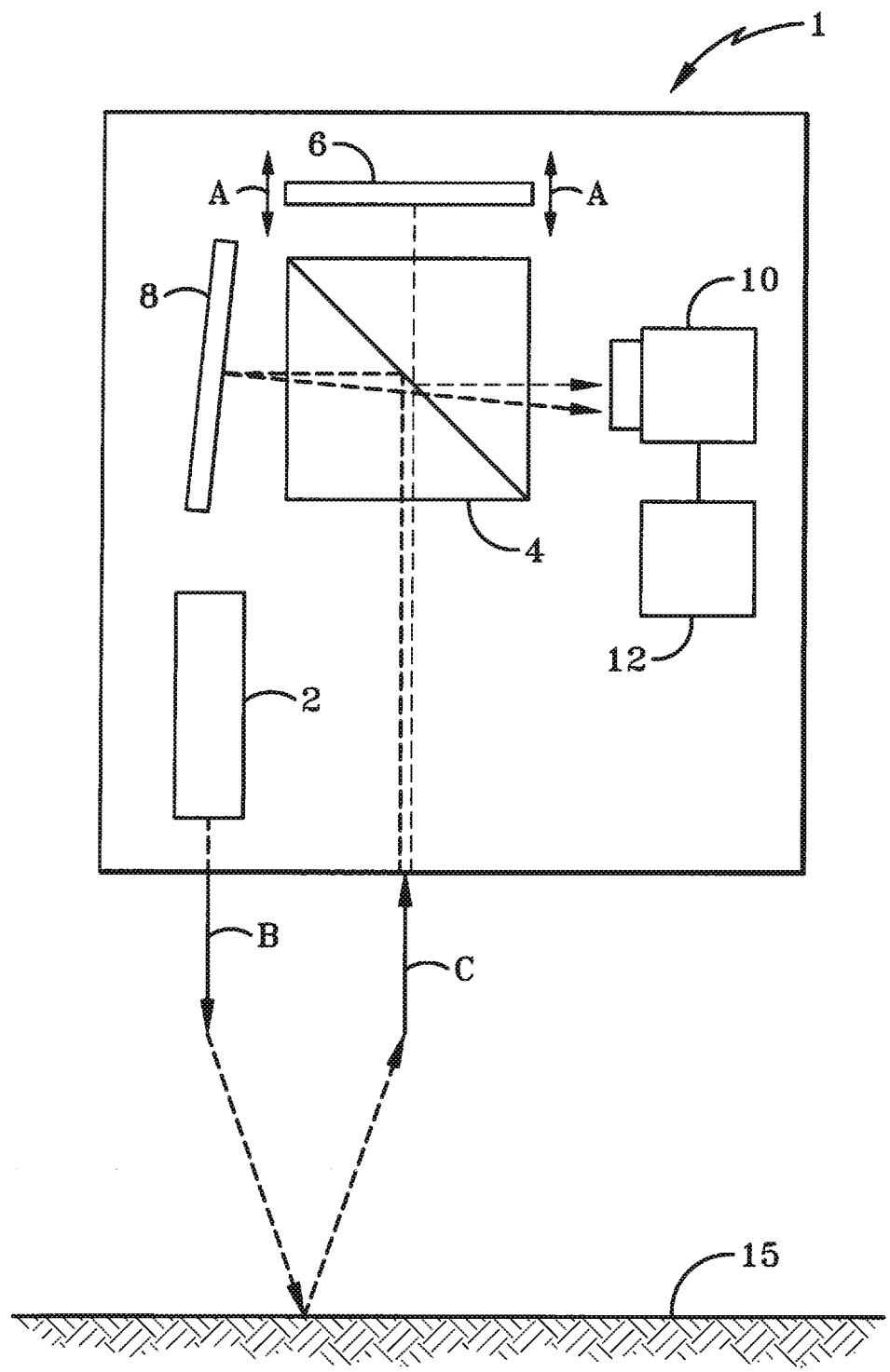
FIG. 1 is a schematic view of a temporal-stepping shearography apparatus.

FIG. 1 shows a temporal-stepping shearography apparatus 1 of a system which may include a Michelson interferometer comprising one or more laser transmitters 2, a beam splitter 4, first and second mirrors 6 and 8, an image-shearing camera 10 and a computer or central processing unit (CPU) 12. One of the mirrors may be steppable or movable (Arrows A) to provide a straightforward phase-stepping system 1. Here, untilted mirror 6 is shown as a steppable mirror, as indicated by the arrows adjacent mirror 6, whereas mirror 8 is may be a tilted mirror for adjusting the shear tilt. Using the untilted mirror 6 as the stepper provides mechanical simplicity and robustness. A piezo-electric actuator may be provided in operative communication with mirror 6 for moving mirror 6 physically. Alternately, an electronically controllable phase retarder may be used, but this will reduce throughput (possible requiring use of more laser power). Typically, the piezo-electric actuator is controlled to vibrate mirror 6 and laser transmitter 2 is controlled or triggered to fire at the desired mirror positions, that is, when mirror 6 is at respective desired positions.

Although a Michelson interferometer is suitable for the present process, a variety of shearing interferometers may be used, such that the interferometer is configured to collect multiple shearographic images with controlled phase differences between the arms of the interferometer. A shearing configuration of any interferometer type is usable. For example and without limitation, suitable interferometers may include glass-plate or glass-wedge interferometers, air-wedge interferometers, Mach-Zender interferometers and so forth. Multi-port versions of any type of shearing interferometer may also be used.

Figure 2:
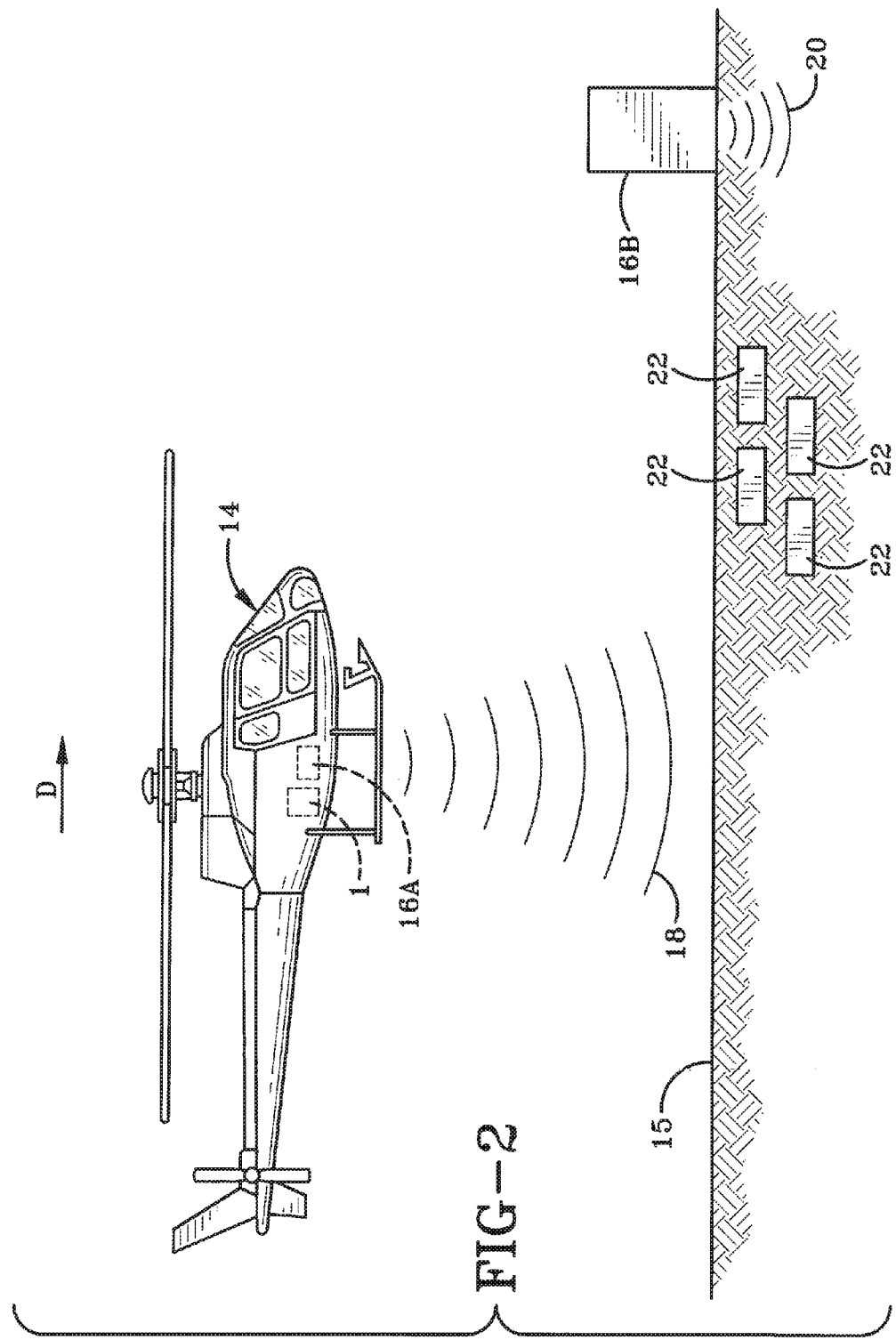
FIG. 2 is a diagrammatic view showing a sample use of the shearography apparatus onboard a moving platform.

FIG. 2 shows that the shearography equipment or apparatus 1 may be mounted on a moving platform 14, which may include powered transport or vehicles such as aircraft, watercraft (surface craft or underwater craft), spacecraft or land motor vehicles which may be manned or unmanned, whereby, for instance, an aircraft may be a manned/piloted aircraft or an unmanned aerial vehicle (UAV). Platform 14 may also be a handheld device which may move simply as a result of being carried by a person who is moving (under his or her own power or via a powered vehicle) or by being carried by one of the other moving platforms noted above. For purposes of example, moving platform 14 is shown as a helicopter, which however represents any suitable moving platform which may carry equipment 1 whereby equipment 1 moves with platform 14 relative to a target or target surface 15 during operation of equipment 1. This movement of platform 14 and apparatus 1 is shown at Arrow D in FIG. 2, which also represents the forward direction of movement or flight of platform 14. The movement of platform 14 and apparatus 1 during the emission of laser beams and collection of specklegrams is typically generally parallel to the target surface or ground.

A target excitation device 16 may be provided in various forms to non-destructively deform or load target 15. Device 16 may be an onboard excitation device 16A mounted on moving platform 14 or may be a separate excitation device 16B which is separate from or not on moving platform 14. Device 16A may be, for instance, a sound driver or acoustic source or speaker capable of producing or emitting sound waves 18, for example, a relatively high power, low frequency sound wave which is directed from moving platform 14/apparatus 1 toward the ground or other target surface 15 to vibrate (deform or load) the ground or other target 15. Separate device 16B may be, for example, a seismic thumper which may be in the form of a thumper truck, which may also be known as a vibroseis truck or vibe truck. A seismic thumper may impact or be directed toward the ground or other target to likewise vibrate (deform or load) the ground or other target 15, as illustrated by waves or vibrations 20. The use of shearagraphy equipment 1 allows for the discernment of underground anomalies 22 such as underground ordnance or landmines (including improvised explosive devices or IED) or other subsurface or underground objects or structures such as rooms, tunnels, pipes and so forth.

In the basic operation of shearography apparatus 1, one of the one or more laser transmitters 2 transmits, emits or shoots a laser beam (Arrow B) which impacts a target surface or target area 15 and is reflected from area 15 as a reflected laser beam image (Arrow C) back to apparatus 1 into beam splitter 4, onto mirrors 6 and 8 and into camera 10, which captures the reflected image in two copies which are laterally displaced (sheared image copies) and combined to form a specklegram. The reflected laser beam images and specklegrams are collected and stored or saved in a memory of CPU 12, which includes a computer program of the shearography system which is configured to process the specklegrams to produce a shearogram from which can be discerned surface changes of target surface 15 and corresponding subsurface structures or movements. The computer program run by CPU 12 is configured to calculate the various relevant equations discussed below in order to effect the methods discussed herein.

Figure 3:
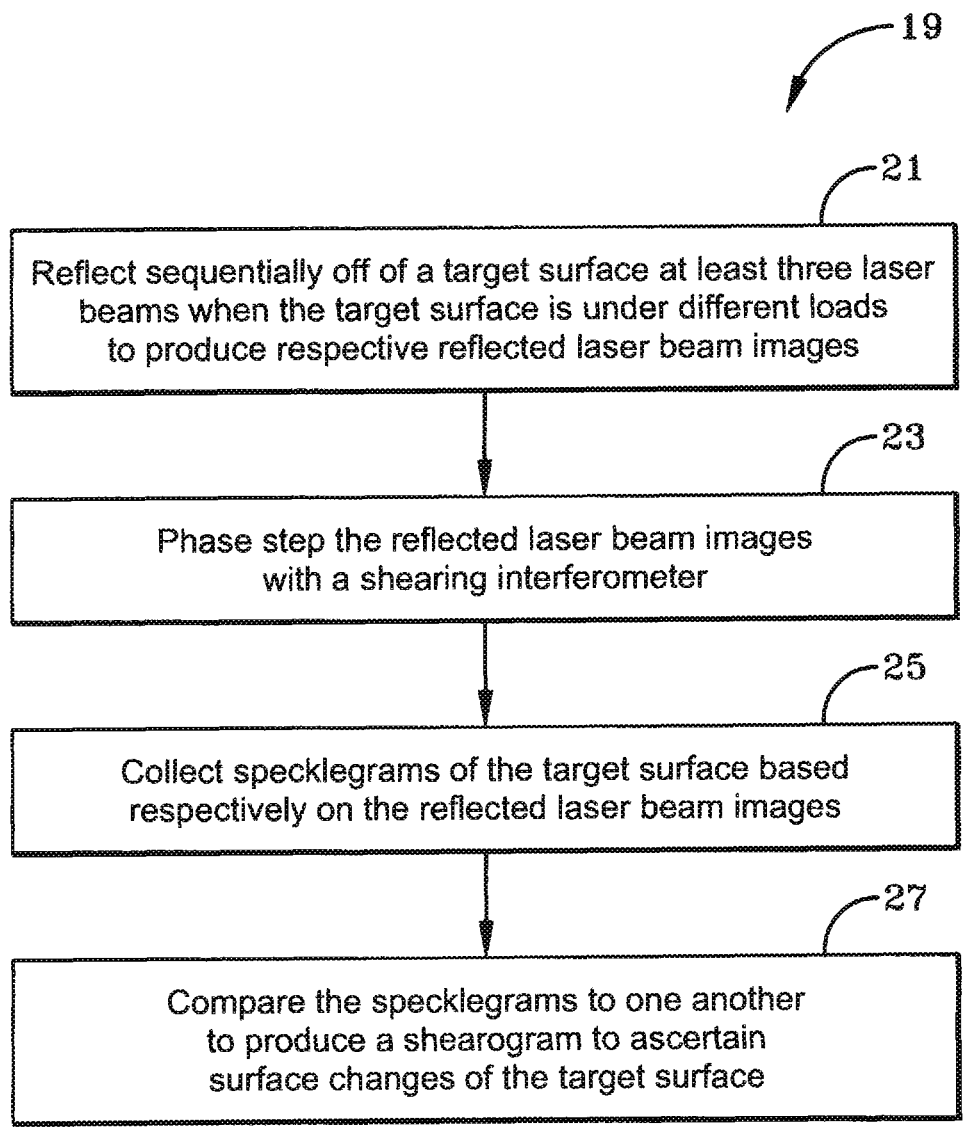
FIG. 3 is a flowchart showing a shearography method.

One shearography method 19 is shown in FIG. 3. As shown in block 21, the method may include reflecting sequentially off of a target surface (such as 15) at least three laser beams when the target surface is respectively under different loads (and different surface states) to produce respective reflected laser beam images. This method may then include the steps of phase stepping the reflected laser beam images with a shearing interferometer (block 23), collecting specklegrams of the target surface based respectively on the reflected laser beam images (block 25), and comparing the specklegrams to one another to create or produce a shearogram to ascertain surface changes of the target surface (block 27). The shearing interferometer of shearography equipment 1 is configured with stepping mirror 6 or another phase shifting or phase stepping optical element to phase shift or phase step the reflected laser beams images. Typically, three or four laser beam emissions or shots are used to respectively produce three or four reflected laser beam images, which in turn are used to respectively produce three or four specklegrams. It is noted that for a given set of the laser beams (e.g., three or four) used to derive a given specklegram, the laser beam wavelength of each laser beam is the same for that given set. A set of three specklegrams may be processed or compared to one another to produce a given shearogram or a set of four specklegrams may be processed or compared to one another to produce a given shearogram. This process may be repeated as many times as desired to produce as many shearograms as desired over time.

Thus, for instance, a first shearogram may provide information indicative of surface changes (such as surface relief changes) of the target surface at a given time (when a given/first set of laser beams used to create a specklegram are reflected off of the target surface); a second shearogram may provide information indicative of surface changes of the target surface at a subsequent given time (when a given/second subsequent set of laser beams used to create a specklegram are reflected off of the target surface); a third shearogram may provide information indicative of surface changes of the target surface at a subsequent given time (when a given/third subsequent set of laser beams used to create a specklegram are reflected off of the target surface); and so forth. The first, second, third etc shearograms thus provide surface change information at time intervals so that the observer of the shearograms can discern surface changes of the target surface over time, which may even occur in a movie format in essentially real time. Various aspects of the method or methods at issue are discussed in greater detail hereafter.

When onboard excitation device 16A is a sound driver, device 16A is operated to insonify target area 15, thereby deforming or loading target 15. Separate device 16B may also be used. In either case, the target surface 15 is deformed or loaded. It is noted that other sources (e.g., ambient excitations) of deformation or vibration may also be used to deform or load the target surface, wherein such sources are not controlled by the user or investigator. Thus, for instance, any natural source of vibration may be used as an excitation providing a given load on the target surface. While surface 15 is thus deformed or loaded with a first load, one of laser transmitters 2 transmits or shoots a first laser beam (Arrow B) onto target area 15 such that the first laser beam is reflected (Arrow C) and sheared and phase stepped/shifted via the shearing interferometer to produce an image which is captured by camera 10 and saved or stored. Very shortly (typically a few milliseconds) after producing the first load and after the first transmission of the laser beam, device 16A or 16B (or another source) may be operated to similarly deform or load target 15 with a second load which is different from the first load. While surface 15 is thus deformed or loaded with the second load, one of laser transmitters 2 likewise transmits or shoots a second laser beam (Arrow B) onto target area 15 so that the second laser beam is likewise reflected (Arrow C) and sheared and phase stepped via the interferometer to produce an image which is captured by camera 10 and saved or stored. This process of loading target area 15 with different loads and transmitting laser beams onto target area 15 may occur multiple times at very brief time intervals (again, typically a few milliseconds between a given pair of loads and a given pair of laser shots). Thus, for instance, shortly after producing the second load and after the second laser beam transmission, device 16 (or another source) may load target 15 with a third load which is different from the first and second loads, so that while surface 15 is loaded with the third load, one of laser transmitters 2 transmits onto target area 15 a third laser beam which is reflected and sheared and phase stepped via the interferometer to produce a third image captured by camera 10 and saved or stored; and shortly after producing the third load and after the third laser beam transmission, device 16 (or another source) may load target 15 with a fourth load which is different from the first, second and third loads, so that while surface 15 is loaded with the fourth load, one of laser transmitters 2 transmits onto target area 15 a fourth laser beam which is reflected and sheared and phase stepped via the interferometer to produce a fourth image captured by camera 10 and saved or stored. This process may continue although three or four laser shots and captured images are typically sufficient to produce a given shearogram with the desired information as to a certain target area of a given size. Nonetheless, this process may continue with respect to a larger target area in order to produce as many shearograms as needed to obtain the desired information. As noted or suggested above, the time between a given pair of laser shots and between a given pair of loads may be very short. The time between laser beam shots may be less than ½ the wavelength of an acoustic excitation or sound wave. While this may vary, in many cases, three, four or five laser beam shots may occur within five or ten milliseconds.

This system and method are set up in a manner which allows for obtaining shearograms without using unloaded specklegrams. Rather, the shearography equipment may be used to produce a plurality of laser emissions to the ground or other target surface while that surface is loaded by an excitation device (controlled or uncontrolled) such that all of the specklegrams may be loaded specklegrams. The present method is discussed in greater detail further below after additional background information on shearography is discussed to provide additional context for the invention.

Shearography Equations

The Sheared Specklegram Equation is shown in Table 1. We have three unknowns in each Specklegram: background intensity $I_0$, interferogram contrast $\gamma$, and sheared phase difference $\phi$.

TABLE 1

$I(x, y, t)|_{\Delta x_{Shear}, \Delta y_{Shear}} = I_0(x, y, t)|_{\Delta x_{Shear}, \Delta y_{Shear}} \times$
$\{1 + \gamma(x, y, t)|_{\Delta x_{Shear}, \Delta y_{Shear}} \cos[\phi_{Signal}(x, y, t)|_{\Delta x_{Shear}, \Delta y_{Shear}} +$
$\phi_{Speckle}(x, y)|_{\Delta x_{Shear}, \Delta y_{Shear}} + \phi_{Step}(t)]\}$ The goal is to recover the information encoded in the signal phase, including the sign of the phase. Details concerning the terms in the Specklegram Equation are shown in Table 2.

TABLE 2

Specklegram Intensity:

$I_0(x, y)|_{\Delta x_{Shear}, \Delta y_{Shear}} = I_{Random}(x, y) + I_{Random}(x + \Delta x_{Shear}, y + \Delta y_{Shear})$ Specklegram contrast:

$\gamma(x, y)|_{\Delta x_{Shear}, \Delta y_{Shear}} = \sqrt{I_{Random}(x, y) \times I_{Random}(x + \Delta x_{Shear}, y + \Delta y_{Shear})} / I_0(x, y)|_{\Delta x_{Shear}, \Delta y_{Shear}}$ Signal Phase:

$\varphi_{Signal}(x, y, t)|_{\Delta x_{Shear}, \Delta y_{Shear}} = 2 \times \frac{2\pi}{\lambda} \times [h(x + \Delta x_{Shear}, y + \Delta y_{Shear}, t) - h(x, y, t)]$ Random Speckle Phase:

$\varphi_{Speckle}(x, y)|_{\Delta x_{Shear}, \Delta y_{Shear}} \approx 2 \times \frac{2\pi}{\lambda} \times [R(x + \Delta x_{Shear}, y + \Delta y_{Shear}) - R(x, y)]$ Shearography nomenclature is shown in Table 3.

TABLE 3

Speckle interferogram (or specklegram): the image obtained by interfering two speckled wavefronts (images). Two speckle interferograms may be acquired and processed to yield a shearogram. In shearography, the interferometer is configured as a shearing interferometer.
Shearing: displacing or rotating an image in its own plane. In TABLE 3-continued shearography, the image is the complex optical field before detection on a focal plane.
Shearogram: the image produced by differencing two speckle interferograms created with a shearing interferometer arrangement. Fringes are visible where there is high correlation between the two speckle interferograms. This occurs whenever the optical phase difference between the speckle interferograms (at a given pixel) equals an integral multiple of 2 * pi (i.e., integer number of wavelengths of optical path difference).
Shearogram Fringes: generic term for patterns of fringes that appear in shearograms as a consequence of surface motion. In the special case of a surface containing circularly-symmetric time-varying bumps, the typical patterns of shearogram fringes appear as "butterfly" shapes.

Phase Stepping without Source Controls

It will be understood that each specklegram image has three independent sets of unknowns: the intensity I, the signal phase $\phi_{Signal}$ and the random speckle phase $\phi_{Speckle}$. If we had full control of the acoustic source, we could hold the intensity I and the signal phase $\phi_{Signal}$ constant by always pulsing the laser at the same phase of the acoustic excitation. We could then vary $\phi_{Step}$ in time (three separate laser shots) to create three equations to solve for all of the unknowns. This is the usual goal of phase-stepped shearography. Relevant equations are in Table 4.

TABLE 4

If the shifts $\phi_{step}$ = 0°, 120°, and 240°, then:

$I_1 = I_0 \{1 + \gamma \cos \phi\}$ $I_2 = I_0 \{1 + \gamma \cos(\phi + 240°)\} = I_0 \left\{ 1 + \gamma \left[ -\frac{1}{2}\cos\phi + \frac{\sqrt{3}}{2}\sin\phi \right] \right\}$ $I_3 = I_0 \{1 + \gamma \cos(\phi + 120°)\} = I_0 \left\{ 1 + \gamma \left[ -\frac{1}{2}\cos\phi - \frac{\sqrt{3}}{2}\sin\phi \right] \right\}$ $\phi = \phi_{Signal} + \phi_{Speckle}$ The solution to this set of equations is found in the following three equations:

$I_0 = \frac{1}{3}[I_1 + I_2 + I_3], \gamma = \frac{-(I_2 + I_3)}{(I_1 + I_2 + I_3)} \frac{1}{\cos\phi},$

|  | 90° |  |
| --- | --- | --- |
| tan φ < 0 |  | tan φ > 0 |
| ($I_2 - I_3$) > 0 |  | ($I_2 - I_3$) > 0 |
| ($2I_1 - I_2 - I_3$) < 0 |  | ($2I_1 - I_2 - I_3$) > 0 |
| 180° |  | 0° |
| tan φ > 0 |  | tan φ < 0 |
| ($I_2 - I_3$) < 0 |  | ($I_2 - I_3$) < 0 |
| ($2I_1 - I_2 - I_3$) < 0 |  | ($2I_1 - I_2 - I_3$) < 0 |
|  | −90° |  | and $\tan \phi = \sqrt{3} \left[ \frac{I_2 - I_3}{2I_1 - I_2 - I_3} \right]$

Phase-quadrant ambiguities are resolved by examining the signs of the numerator and denominator in the tan φ equation. Because the speckle phase is still included, we need a plurality of laser shots to recover the ground phase. More particularly, when using pulsed laser shots, at least three laser shots and three specklegrams are needed to provide PR shearograms in the present method.

Information Extraction via Phase Stepping

Unfortunately, for stand-off buried-object detection, we do not have complete control of the acoustic excitation. Acoustic phase and amplitude are usually stochastic, and frequency may also be uncertain. We can still obtain the rate of change of the signal phase (including sign) by using basic temporal phase-stepping hardware with some algorithmic twists. The procedure is further described in Tables 5, 6, and 7.

TABLE 5

1. Acquire a sequence of specklegrams with a time separation Δt between successive images.
2. Alternate $\phi_{Step}$ at each time step between three phases separated by ⅓ wave:
0, +2π/3, +4π/3, 0, +2π/3, +4π/3, 0, +2π/3, +4π/3 radians . . .
. . . Since adding an integer number of waves yields the same interference conditions, this sequence is equivalent to:
0, +2π/3, +4π/3, 2π, 8π/3, 10π/3, 4π, 14π/3, 16π/3 radians . . .
3. Assumptions are generally: (a) Images are bright, so that shot noise << speckle noise, (b) Laser interpulse time << speckle decorrelation time, (c) Signal spatial wavelengths are >> speckle sizes, and (d) Signal spatial wavelengths are >> shear distance.

One skilled in the art will understand the general assumptions noted in Table 3. For instance, the shot noise being much less than the speckle noise generally means that the laser speckle is the major source of noise in the imagery. One skilled in the art can determine this readily by examining the imagery and applying standard statistical computations. With respect to the laser interpulse time being much less than speckle decorrelation time, the laser interpulse time needs to be short enough for at least three laser shots, and preferably four laser shots, to be acquired in less than the speckle decorrelation time. Thus, a laser interpulse time less than ⅓ or ¼ the speckle decorrelation time is typically adequate. Shorter interpulse times are acceptable but not required.

It is noted that the terms "decorrelation time," "correlation time," and "coherence time" may be used interchangeably. The correlation time $\tau_C$ is the time over which two samples, separated by some time t, of a laser beam which is perfectly coherent appear to lose coherence. When t<$\tau_C$, the samples are coherent (highly correlated) with each other. The coherence losses are due to fluctuations in the media through which the laser beams pass, such as turbulence or aerosol scattering in air. The coherence time can be many seconds long in well-controlled laboratory or medical-imaging conditions. In airborne buried-object-detection applications of the present method (i.e., when platform 14 is an aircraft using equipment 1 to detect underground objects), a coherence time of five milliseconds is typical. As the time t between laser samples increases beyond $\tau_C$, coherence decreases gradually, so that shearographic processing can still work, but with decreasing signal-to-noise as time t further increases above $\tau_C$.

As to the signal spatial wavelengths being much greater than the speckle sizes, this depends on the high-level requirements (probability of detection, probability of recognition, etc.) for the mission for which the system is being designed. Typical detection requirements would sample the surface at a minimum spatial frequency corresponding to Nyquist sampling of the wavelengths of interest. Finer sampling would yield more accurate estimates of surface vibration or motion of the target. Thus, the system designer would trade accuracy for area coverage, since the number of pixels per second that can be collected is usually a constraint. Regarding the signal spatial wavelengths being much greater than the shear distance, this is not a hard and fast rule. The ideal distance depends on how the target surface is vibrating. If it is vibrating locally, for example sand over a resonating cavity, the ideal shear distance is less than the diameter of the cavity. For travelling sinusoidal surface waves, the ideal shear distance is one-half of the wavelength. In both cases, shorter shear distances can be used. For longer shear distances, information can still be extracted, though some information may be aliased from high spatial frequencies into lower spatial frequencies. A system designer skilled in the art would determine how much aliasing is tolerable, and choose the shear distances accordingly.

TABLE 6

$\phi_N \equiv \phi_{Speckle}(r)$ (s1): $I(r, t_0)|_{specklegram} \approx I_0(r) \times \{1 + \gamma(r) \cos[\phi_{Signal}(r, t_0) + \phi_N]\}$ (s2): $I(r, t_0 + \Delta t)|_{specklegram} \approx I_0(r) \times \{1 + \gamma(r) \cos[\phi_{Signal}(r, t_0 + \Delta t) + \phi_N + 2\pi/3]\} = I_0(r) \times \{1 + \gamma(r)\frac{1}{2}(-\cos[\phi_{Signal}(r, t_0 + \Delta t) + \phi_N] + \sqrt{3}\sin[\phi_{Signal}(r, t_0 + \Delta t) + \phi_N])\}$ (s3): $I(r, t_0 + 2\Delta t)|_{specklegram} \approx I_0(r) \times \{1 + \gamma(r) \cos[\phi_{Signal}(r, t_0 + 5\Delta t) + \phi_N + 4\pi/3]\} = I_0(r) \times \{1 + \gamma(r)\frac{1}{2}(-\cos[\phi_{Signal}(r, t_0 + 2\Delta t) + \phi_N] - \sqrt{3}\sin[\phi_{Signal}(r, t_0 + 2\Delta t) + \phi_N])\}$ (s4): $I(r, t_0 + 3\Delta t)|_{specklegram} \approx I_0(r) \times \{1 + \gamma(r) \cos[\phi_{Signal}(r, t_0 + 3\Delta t) + \phi_N]\}$
⋮

A first specklegram is represented in Table 6 as (s1), a second specklegram as (s2), a third specklegram as (s3), and a fourth specklegram as (s4). Similar representations are used elsewhere in the present application and may also simply be, respectively, s1, s2, s3 and s4, etc.

TABLE 7

Expand trigonometric functions to separate speckle from signal $\cos[\phi_{Signal}(r, t_1) + \phi_N] = \cos \phi_{Signal}(r, t_1)\cos \phi_N - \sin \phi_{Signal}(r, t_1)\sin \phi_N$ $\sin[\phi_{Signal}(r, t_1) + \phi_N] = \cos \phi_{Signal}(r, t_1)\sin \phi_N + \sin \phi_{Signal}(r, t_1)\cos \phi_N$ so that the sequence of equations can be expressed as the matrix equation:

$$\begin{bmatrix} (s1) \\ (s2) \\ (s3) \\ (s4) \\ \vdots \end{bmatrix} = \begin{bmatrix} 1 & \cos\phi_{Signal}(r, t_1) & \sin\phi_{Signal}(r, t_1) \\ 1 & \frac{1}{2}[\cos\phi_{Signal}(r, t_1 + \Delta t) - \sqrt{3}\sin\phi_{Signal}(r, t_1 + \Delta t)] & \frac{1}{2}[\sqrt{3}\cos\phi_{Signal}(r, t_1 + \Delta t) + \sin\phi_{Signal}(r, t_1 + \Delta t)] \\ 1 & \frac{1}{2}[\cos\phi_{Signal}(r, t_1 + 2\Delta t) + \sqrt{3}\sin\phi_{Signal}(r, t_1 + 2\Delta t)] & \frac{1}{2}[\sqrt{3}\cos\phi_{Signal}(r, t_1 + 2\Delta t) - \sin\phi_{Signal}(r, t_1 + 2\Delta t)] \\ 1 & \cos\phi_{Signal}(r, t_1 + 3\Delta t) & \sin\phi_{Signal}(r, t_1 + 3\Delta t) \\ \vdots & \vdots & \vdots \end{bmatrix} \begin{bmatrix} I_0(r) \\ I_0(r)\gamma(r)\cos\phi_N \\ I_0(r)\gamma(r)\sin\phi_N \end{bmatrix}$$

We can invert the matrix equations in Table 7 in groups of three to eliminate $I_0$, $\gamma$, and $\phi_N$, obtaining relationships between our measured speckle interferograms and the phases of the ground motion. The set of equations looks under-determined, but it is usually not. There is a dispersion relationship between the spatial and temporal frequencies, and we have hundreds of independent spatial measurements. Thus, we can obtain complete information up to the temporal Nyquist frequency (½Δt).

Set of Equations Relating Measured Specklegrams to Quantities of Interest

Given four phase-stepped specklegrams collected sequentially at time $t_1$, $t_2$, $t_3$ and $t_4$, the speckle phase, intensity, and contrast can be eliminated in favor of the signal phases, yielding three equations shown in Table 8.

TABLE 8

$$\begin{bmatrix}(s1)\\(s2)\\(s4)\end{bmatrix} = \begin{bmatrix} 1 & \cos\phi_{Signal}(r, t_1) & \sin\phi_{Signal}(r, t_1)\\ 1 & \frac{1}{2}[\cos\phi_{Signal}(r, t_2) - \sqrt{3}\sin\phi_{Signal}(r, t_2)] & \frac{1}{2}[\sqrt{3}\cos\phi_{Signal}(r, t_2) + \sin\phi_{Signal}(r, t_2)]\\ 1 & \cos\phi_{Signal}(r, t_4) & \sin\phi_{Signal}(r, t_4) \end{bmatrix} \times$$

$$\begin{bmatrix} 1 & \cos\phi_{Signal}(r, t_1) & \sin\phi_{Signal}(r, t_1)\\ 1 & \frac{1}{2}[\cos\phi_{Signal}(r, t_3) + \sqrt{3}\sin\phi_{Signal}(r, t_3)] & \frac{1}{2}[\sqrt{3}\cos\phi_{Signal}(r, t_3) - \sin\phi_{Signal}(r, t_3)]\\ 1 & \cos\phi_{Signal}(r, t_4) & \sin\phi_{Signal}(r, t_4) \end{bmatrix}^{-1} \begin{bmatrix}(s1)\\(s3)\\(s4)\end{bmatrix}$$

Two of these equations are identities. Only the one containing specklegram (s2) conveys useful information.

a. Small Amplitudes

The primary uses of the remote detection of buried object (such as mines and IED) and the remote detection of buried structures (such as underground rooms and tunnels). Other uses include non-contact sensing of accousto-seismic vibrations for other applications including investigation of properties to the transmitting medium. Since the technique is sensitive to extremely small surface amplitude changes there are likely many other applications. Including the possible real-time measurement of small surface changes (i.e. the development of oxidation layers or biofilms).

If the amplitudes of the ground motion or target motion are much less than the wavelength of the light, then the equations in Table 9 apply.

TABLE 9

$\cos\phi_{Signal}(r, t_j) \approx 1$, and $\sin\phi_{Signal}(r, t_j) \approx \phi_{Signal}(r, t_j)$ So that:

$$\begin{bmatrix}(s1)\\(s2)\\(s4)\end{bmatrix} \approx \begin{bmatrix} 1 & 1 & \phi_{Signal}(r, t_1)\\ 1 & -\frac{1}{2}[1-\sqrt{3}\phi_{Signal}(r, t_2)] & \frac{1}{2}[\sqrt{3} + \phi_{Signal}(r, t_2)]\\ 1 & 1 & \phi_{Signal}(r, t_4) \end{bmatrix} \times \begin{bmatrix} 1 & 1 & \phi_{Signal}(r, t_1)\\ 1 & -\frac{1}{2}[1+\sqrt{3}\phi_{Signal}(r, t_3)] & -\frac{1}{2}[\sqrt{3} - \phi_{Signal}(r, t_3)]\\ 1 & 1 & \phi_{Signal}(r, t_4) \end{bmatrix}^{-1} \begin{bmatrix}(s1)\\(s3)\\(s4)\end{bmatrix}$$

Collecting like terms in the (s2) equation and retaining only first-order terms in $\phi_{signal}$ yields an expression for the temporal difference of the phase in terms of the measured specklegrams as shown in Table 10:

TABLE 10

$$\therefore [\phi_{Signal}(r, t_4) - \phi_{Signal}(r, t_1)] \approx \sqrt{3}\frac{[(s4)-(s1)]}{[(s2)-(s3)]}$$

The significance of this result is that the usual phase-stepped shearography equation (see Table 4) yields a phase which is a sum of the signal and the speckle phases. This random phase dominates the noise in shearogram images, and adds significant processing burden to signal-recovery process. It will be understood that our process and algorithm has eliminated or essentially eliminated the random speckle phase. This not only greatly reduces the processing burden, but it also greatly improves the signal to noise ratio (SNR) of the recovered signal.

b. Surface Velocity

The results of a test of a sample embodiment is shown in Tables 11 and 12.

TABLE 11

In terms of phase rates of change, $$[\phi_{Signal}(r, t_4) - \phi_{Signal}(r, t_1)] \approx \frac{\partial\phi_{Signal}(r, t)}{\partial t} \times (t_4 - t_1) \approx 3\frac{\partial\phi_{Signal}(r, t)}{\partial t}\Delta t$$

so that, for the switching sequence 0, +λ/3, +2λ/3, 0, we have:

$$\frac{\partial\phi_{Signal}(r, t)}{\partial t}\Delta t\bigg|_{t \approx (t_1+t_4)/2} \approx \frac{1}{3}[\phi_{Signal}(r, t_4) -$$

$$\phi_{Signal}(r, t_1)] \approx \frac{1}{\sqrt{3}}\frac{[(s1)-(s4)]}{[(s2)-(s3)]}$$

TABLE 11-continued

Since the signal phase velocity is given by:

$$\varphi_{Signal}(r, t)\bigg|_{\Delta r_{Shear}} = \frac{4\pi}{\lambda} \times [h(r + \Delta r_{Shear}, t) - h(r, t)] \approx \frac{4\pi}{\lambda}\nabla h(r, t) \cdot \Delta r_{Shear},$$

then the horizontal gradient of the velocity normal to the surface can be computed from the specklegrams:

TABLE 11-continued $$\frac{1}{\sqrt{3}} \frac{[(s1)-(s4)]}{[(s2)-(s3)]} \approx \frac{\partial \phi_{Signal}(r,t)}{\partial t}\Delta t\bigg|_{t \approx (t_1+t_4)/2} \approx \frac{4\pi}{\lambda}\Delta r_{Shear}.$$

$$\nabla \frac{\partial}{\partial t} h(r,t) \approx \frac{4\pi}{\lambda}\Delta r_{Shear} \cdot \nabla v_\perp(r,t)$$

The surface-velocity-gradient components in the shear direction are given by:

$$\frac{4\pi}{\lambda}\Delta r_{Shear} \cdot \nabla v_\perp(r,t)\bigg|_{t \approx \frac{1}{2}(t_{n+3}+t_n)} \approx \frac{1}{\sqrt{3}} \frac{[(s_n)-(s_{n+3})]}{[(s_{n+1})-(s_{n+2})]}$$

so that two orthogonal interferometers viewing the area of interest c completely characterize the surface velocity field.

Multi Sampling Capability

As shown in Table 13, multiple formulations of the phase resolved (PR) shearogram equation are possible. These formulations represent alternative phase offsets between the sampling system and the ground vibrations. When these alternate shearogram formulations are used together, the net result is that the ground oscillations are sampled at multiple phase offsets.

TABLE 13

Multiple formulations of the phase resolved (PR) shearogram equation are possible; three methods are shown below although other formulations are possible.

Method 1: Standard shearogram equation (see Table 10).

$$Shear_{PR\_1} = \sqrt{3}\left[\frac{(s4)-(s1)}{(s2)-(s3)}\right]$$

Method 2: "Peak straddling"—this method gives a maximum signal when S1 = S4 (in this situation, Method 1 would return 0).

$$Shear_{PR\_2} = \left[\frac{[(s2)-(s1)]+[(s2)-(s3)]+[(s2)-(s4)]}{[(s2)-(s1)]+[(s3)-(s4)]}\right]$$

Method 3: This method always works, but has the disadvantage of yielding ½ the signal of Method 1 when the viewing conditions are optimal.

$$Shear_{PR\_3} = \frac{1}{\sqrt{3}}\left[\frac{2[(s2)-(s1)]+[(s2)-(s3)]}{[(s2)-(s1)]+[(s3)-(s1)]}\right]$$

The minimum number of specklegrams needed to do phase-resolved processing is three. $Shear_{PR\_3}$ in Table 13, for instance, only uses three specklegrams (s1), (s2) and (s3) to produce a shearogram. These three specklegrams have phase mirror positions of 0, $+2\pi/3$, and $+4\pi/3$ radians, respectively (or are otherwise phase stepped to those phases). $Shear_{PR\_1}$ in Table 13 uses four specklegrams with respective mirror positions of 0, $+2\pi/3$, $+4\pi/3$, and 0 radians. $Shear_{PR\_1}$ will have much less speckle noise than $Shear_{PR\_3}$, especially for very small surface-motion amplitudes. Either

TABLE 12

As the mirror translates steadily, the switching sequence progresses linearly, and the equations are the same, regardless of which phase is first in the sequence:

| time | Phase (waves) | s | time | Phase | s | time | Phase | s | time | Phase | s |
|---|---|---|---|---|---|---|---|---|---|---|---|
| $t_1$ | 0 | s1 | $t_1 + \Delta t$ | $+\lambda/3$ | s2 | $t_1 + 2\Delta t$ | $+2\lambda/3$ | s3 | $t_1 + 3\Delta t$ | 0 | s4 |
| $t_1 + \Delta t$ | $+\lambda/3$ | s2 | $t_1 + 2\Delta t$ | $+2\lambda/3$ | s3 | $t_1 + 3\Delta t$ | 0 | s4 | $t_1 + 4\Delta t$ | $+\lambda/3$ | s5 |
| $t_1 + 2\Delta t$ | $+2\lambda/3$ | s3 | $t_1 + 3\Delta t$ | 0 | s4 | $t_1 + 4\Delta t$ | $+\lambda/3$ | s5 | $t_1 + 5\Delta t$ | $+2\lambda/3$ | s6 |
| $t_1 + 3\Delta t$ | 0 | s4 | $t_1 + 4\Delta t$ | $+\lambda/3$ | s5 | $t_1 + 5\Delta t$ | $+2\lambda/3$ | s6 | $t_1 + 6\Delta t$ | 0 | s7 |
| $[\phi_{Signal}(r,t_4) - \phi_{Signal}(r,t_1)] \approx$ | | | $[\phi_{Signal}(r,t_5) - \phi_{Signal}(r,t_2)] \approx$ | | | $[\phi_{Signal}(r,t_6) - \phi_{Signal}(r,t_3)] \approx$ | | | $[\phi_{Signal}(r,t_7) - \phi_{Signal}(r,t_4)] \approx$ | | |
| $\sqrt{3}\frac{[(s1)-(s4)]}{[(s2)-(s3)]}$ | | | $\sqrt{3}\frac{[(s5)-(s2)]}{[(s4)-(s3)]}$ | | | $\sqrt{3}\frac{[(s6)-(s3)]}{[(s5)-(s4)]}$ | | | $\sqrt{3}\frac{[(s4)-(s7)]}{[(s5)-(s6)]}$ | | | algorithm will output a signal proportional to the ground surface motion or target surface motion, with a sample-rate-dependent relative phase lag of up to $\pi$ radians.

Basics of Sheared Specklegram Images

Before providing additional details concerning the present method, we now broaden the discussion of basic concepts of shearography. Each specklegram or specklegram image represents a combination of two images which pass through separate arms of a shearing interferometer before being combined and recorded on a focal plane. A shearing interferometer operates by using a beam-splitter or other optical element to make copies of an incoming light field. An optical shearing device, such as a tilted mirror, shear plate or other element known in the art, shifts the copies relative to each other such that a pixel representing location (x,y) in one copy appears at a point $(x+\Delta x_{Shear}, y+\Delta_{Shear})$ in another copy. These two light fields are identical, other than the location shift. The relatively-shifted copies of the light field are optically recombined and recorded on a focal plane, creating an image called a sheared speckle gram. Because the illumination is coherent, and the surface being illuminated is microscopically rough, the reflected light field has intensities and phases containing random fluctuations from point to point, so that the recorded image contains intensity fluctuations called speckles. Speckles are random from point to point in an image, with an intensity which is influenced both by the deterministic geometry of the area under investigation, and by statistical fluctuations. The statistical fluctuations have a time dependence which is characterized by a correlation time scale $\tau_C$. The correlation time $\tau_C$ is determined by the imaging conditions, and can be several seconds long. The shearing interferometer is operated to record a sequence of specklegram images at times $t_1$, $t_2$, $t_3$, $t_4$, etc., which are separated by a time less than $\tau_C$. Under these conditions, the statistical components of speckle are nearly identical between the specklegram images, so that the $j^{th}$ specklegram image can be expressed as:

$$I(x, y, t_j)|_{\Delta x_{Shear}, \Delta y_{Shear}} = I_0(x, y)|_{\Delta x_{Shear}, \Delta y_{Shear}} \times \quad (1)$$

-continued $$\{1 + \gamma(x, y)|_{\Delta x_{Shear},\Delta y_{Shear}} \cos[\phi_{Signal}(x, y, t_j)|_{\Delta x_{Shear},\Delta y_{Shear}} +$$
$$\phi_{Speckle}(x, y)|_{\Delta x_{Shear},\Delta y_{Shear}} + \phi_{Step}(x, y, t_j)]\}$$

The terms in Equation (1) immediately above are as follows: $I_0(x,y)$ is the average intensity of the two image copies. Since the image copies are identical, except for the shearing distance, this can be expressed in terms of a single statistically random intensity image:

$$I_0(x,y)|_{\Delta x_{Shear},\Delta y_{Shear}} = I_{Random}(x,y) + I_{Random}(x+\Delta x_{Shear}, y+\Delta y_{Shear}). \quad (2)$$

$\gamma(x,y)$ is the contrast between points separated by the shear distance ($\Delta x_{Shear}$, $\Delta y_{Shear}$):

$$\gamma(x, y)|_{\Delta x_{Shear},\Delta y_{Shear}} = \quad (3)$$
$$\frac{\sqrt{I_{Random}(x, y) \times I_{Random}(x + \Delta x_{Shear}, y + \Delta y_{Shear})}}{I_0(x, y)|_{\Delta x_{Shear},\Delta y_{Shear}}}$$

$\phi_{Speckle}(x,y)|_{\Delta x_{Shear},\Delta y_{Shear}}$ is the relative random phase at the point (x,y) in the specklegram. $\phi_{Step}(x, y, t_j)$ is the controlled phase difference between the arms of the spectrometer. $\phi_{Signal}(x,y,t_j)|_{\Delta x_{Shear},\Delta y_{Shear}}$ is the phase difference introduced by the difference in surface elevation between points located at (x,y) and (x+$\Delta x_{Shear}$,y+$\Delta y_{Shear}$). This is the quantity of interest—what the shearography system and analysis is designed to estimate.

The shear distance vector ($\Delta x_{Shear}$,$\Delta y_{Shear}$) is selected so that the optical-phase difference $\phi_{Signal}(x,y,t_j)|_{\Delta x_{Shear},\Delta y_{Shear}}$ can vary significantly with time in the presence of deterministic effects, such as surface vibrations, refractive-index changes, thermally-induced deformations, and other physically or chemically-induced changes over time. The effects causing optical phase differences are commonly referred to as loads, and their absence is commonly referred to as an unloaded condition. The loads need not be mechanical—they can be induced by chemical, electrical, thermal, or any phenomena capable of changing optical path-length differences between points separated by ($\Delta x_{Shear}$, $\Delta y_{Shear}$) in the material being imaged. For the specific case of a vibrating opaque surface, the optical phase difference is given in radians by:

$$\varphi_{Signal}(x, y, t)|_{\Delta x_{Shear},\Delta y_{Shear}} = \quad (4)$$
$$2 \times \frac{2\pi}{\lambda} \times [h(x + \Delta x_{Shear}, y + \Delta y_{Shear}, t) - h(x, y, t)],$$

where h(x,y,t) is the time-varying surface elevation at a point (x,y) and time t, and $\lambda$ is the wavelength of the laser light. Because the wavelength of light is short, typically under one micron, extremely small changes in the surface elevation h can be imaged.

To simplify the mathematical expressions in the rest of this discussion, the notation will be simplified as follows: The symbol $\phi_N(x,y)$ refers to the noise image array of the random speckle $\phi_{Speckle}(x,y)|_{\Delta x_{Shear},\Delta y_{Shear}}$, the symbol $\theta_j$ refers to the array of controlled phase steps $\phi_{Step}(x, y, t_j)$ introduced at time $t_j$, usually an array having the same value for all pixels (x,y), the symbol ($s_j$) refers to the $j^{th}$ sheared specklegram image $I(x,y,t_j)|_{\Delta x_{Shear},\Delta y_{Shear}}$, and $\phi_{Signal}(x,y,t_j)|_{\Delta x_{Shear},\Delta y_{Shear}}$ will simply be referred to as $\phi_{Signal}(x,y,t_j)$, since the shear distances are not typically varied within a sequence of specklegram images.

PRIOR ART

Phase-Stepped Shearogram Analysis

The prior/current state of the art continues now with a focus on phase-stepped shearography. The goal of the analysis of specklegram images is to estimate the signal $\phi_{Signal}(x,y,t_j)$ with as little error as possible introduced by the noise terms $I_0$, $\gamma$, and $\phi_N$. Inspection of Equation (1) above shows that the terms $I_0$ and $\gamma$ can be removed by computing ratios of differences of specklegrams. For example:

$$R_{i,j;k,l} = \frac{(si) - (sj)}{(sk) - (sl)} = \frac{\cos[\phi_{Signal}(x, y, t_i) + \phi_N(x, y) + \theta_i] -}{\cos[\phi_{Signal}(x, y, t_k) + \phi_N(x, y) + \theta_k] -} \quad (5)$$
$$\frac{\cos[\phi_{Signal}(x, y, t_j) + \phi_N(x, y) + \theta_j]}{\cos[\phi_{Signal}(x, y, t_l) + \phi_N(x, y) + \theta_l]}.$$

It is also obvious from Equation (1) that ratios of sums of differences of pairs of specklegrams also work to eliminate $I_0$ and $\gamma$. All that is required is that all of the specklegrams are acquired within a time span shorter than the correlation time $\tau_C$.

The ratios of cosines in Equation (5) can vary randomly between $\pm\infty$ and provide little information about the signal phases. Standard phase-stepped shearography addresses this by introducing specific values for the controlled phases $\{\theta_j\}$, and synchronizes the specklegram collection with loading conditions. For a given loading condition, multiple specklegrams are collected with different $\theta_j$s. For example, consider a condition with a load Load_A, such that $\phi_{Signal}(x,y,t) = \phi_{Load\_A}(x,y)$ is the same for all specklegrams. Then Equation (5) becomes:

$$R_{Load\_A} = \frac{\cos[\phi_{Load\_A}(x, y) + \phi_N(x, y) + \theta_i] -}{\cos[\phi_{Load\_A}(x, y) + \phi_N(x, y) + \theta_k] -} \quad (6)$$
$$\frac{\cos[\phi_{Load\_A}(x, y) + \phi_N(x, y) + \theta_j]}{\cos[\phi_{Load\_A}(x, y) + \phi_N(x, y) + \theta_l]}.$$

Expanding the trigonometric functions in Equation (6) shows how the sum of the signal and noise phases might be isolated:

$$\cos\left[\phi_{Load\_A}(x,y) + \phi_N(x,y) + \theta_i\right] = \cos\left[\phi_{Load\_A}(x,y) + \phi_N(x,y)\right]\cos\theta_i - \sin\left[\phi_{Load\_A}(x,y) + \phi_N(x,y)\right]\sin\theta_i; \quad (7)$$

So that Equation (6) reduces to:

$$R_{Load\_A} = \frac{(\cos\theta_i - \cos\theta_j) - \tan[\phi_{Load\_A}(x, y) + \phi_N](\sin\theta_i - \sin\theta_j)}{(\cos\theta_k - \cos\theta_l) - \tan[\phi_{Load\_A}(x, y) + \phi_N](\sin\theta_k - \sin\theta_l)}. \quad (8)$$

As long as $\theta_k \neq \theta_l$, Equation (8) is readily inverted to yield the sum of signal and noise phases:

$$[\phi_{Load\_A}(x, y) + \phi_N(x, y)] = \quad (9)$$
$$\arctan\frac{[(\cos\theta_k - \cos\theta_l)R_{Load\_A} - (\cos\theta_i - \cos\theta_j)]}{[(\sin\theta_k - \sin\theta_l)R_{Load\_A} - (\sin\theta_i - \sin\theta_j)]}.$$

A common choice of the controlled phases is $\theta_k = 0$, $\theta_i = \pi$, $\theta_j = \pi/2$, and $\theta_l = 3\pi/2$, in which case Equation (9) reduces to:

$$[\phi_{Load\_A}(x,y) + \phi_N(x,y)] = \arctan(R_{Load\_A}). \quad (10)$$

Because the random phases $\phi_N$ span the full $2\pi$ radian range of possible phases, Equation (10) doesn't yield a usable measurement of the signal phase. To obtain a usable estimate, another loading condition Load_B must be applied, and the phase-stepped image acquisition repeated. If the second set of images is acquired within the correlation time $\tau_C$, then the signal phase differences can be computed from two successive ratio calculations, to yield a shearogram:

$$[\phi_{Load\_B}(x,y) - \phi_{Load\_A}(x,y)] = \arctan(R_{Load\_B}) - \arctan(R_{Load\_A}). \quad (11)$$

It is also known in the current art that Equation (10) can be derived using three specklegrams, if the phase steps are chosen to be $\theta_1=0$, $\theta_2=2\pi/3$ and $\theta_3=4\pi/3$, and the ratios computed are:

$$R_{Load\_A\ or\ B} = \sqrt{3}\,\frac{[(s2)-(s3)]}{[(s1)-(s2)]+[(s1)-(s3)]}\bigg|_{Load\_A\ or\ B}. \quad (12)$$

Thus, the current state of the art requires at least six specklegrams (two sets of at least three specklegrams) in order to yield the signal phase changes between loading conditions. The specklegrams must be acquired in groups or sets for which the loading conditions are constant for the given group or set. This is readily accomplished for quasi-static loads under the control of the investigator: Load A is applied to a target surface, the system is allowed to settle, a set of at least three phase-stepped specklegrams is acquired, then load B is applied to the target surface, the system is again allowed to settle, and another set of at least three phase-stepped specklegrams is acquired.

If the signal phase varies with time too quickly for quasi-static operation, then the load must be controlled or predicted in such a way that the controlled phases are synchronized with the signal phase so that sets of specklegrams known to be at the same loading condition can be acquired. For example, if the surface loading varies periodically with a period T, then acquiring specklegrams with phases $\theta_1$, $\theta_2$, and $\theta_3$, at time $T_A$, $T_A+T$, and $T_A+2T$, respectively would yield specklegrams for Load A, and acquiring specklegrams with phases $\theta_1$, $\theta_2$, and $\theta_3$, at time $T_B$, $T_B+T$, and $T_B+2T$, respectively would yield specklegrams for Load B.

The requirement that the controlled phases in the shearography system be synchronized with the loading conditions, and that at least two groups of three specklegrams be used to construct a shearogram, is a significant limiter of performance for very dynamic conditions in which the investigator cannot control or predict the loading phases of the area being investigated. Examples include imaging in situations in which dwell times are limited by hazardous conditions (as in a combat situation), or in which the excitation causing the loading is transient and not controlled by the investigator. One alternative is to not use phase stepping, and to construct shearograms by differencing specklegrams acquired under loading conditions with all of the interferometer phases $\theta_i$, $\theta_j$, etc held constant, that is, with no phase stepping at all. It is well known in the art that the resulting differences of specklegrams (sj)-(si) will yield very noisy estimates of the differences between loading conditions, typically requiring many repeated measurements to achieve high sensitivity, again limiting the performance of the measurement system for dynamic or uncontrolled phenomena.

Present System and Method to Separate Signal and Speckle Phase Dynamically

The system/method presented here allows operation of a shearing interferometer with phase stepping in a novel manner which allows for dynamic operation. Computing a highly sensitive estimate of the signal phase requires only four images, and exploits uncontrolled loading conditions, accessing a wider range of phenomena. The mathematical underpinnings are based on Equation (6) above, with the trigonometric functions expanded as follows:

$$\cos[\phi_{Signal}(x,y,t_i) + \phi_N(x,y) + \theta_i] = \cos[\phi_{Signal}(x,y,t_i) + \theta_i] \cos\phi_N(x,y) - \sin[\phi_{Signal}(x,y,t_i) + \theta_i] \sin\phi_N(x,y) \quad (13)$$

Unlike the current art, the controlled phase $\theta_i$ is varied for every image as the load changes with time, the load also varying for each image. This results in a ratio equation of the form:

$$R_{i,j;k,l} = \frac{\left\{\begin{array}{c}\cos[\phi_{Signal}(x,y,t_i)+\theta_i]-\\ \cos[\phi_{Signal}(x,y,t_j)+\theta_j]\end{array}\right\}\cot\phi_N(x,y)-\left\{\begin{array}{c}\sin[\phi_{Signal}(x,y,t_i)+\theta_i]-\\ \sin[\phi_{Signal}(x,y,t_j)+\theta_j]\end{array}\right\}}{\left\{\begin{array}{c}\cos[\phi_{Signal}(x,y,t_k)+\theta_k]-\\ \cos[\phi_{Signal}(x,y,t_l)+\theta_l]\end{array}\right\}\cot\phi_N(x,y)-\left\{\begin{array}{c}\sin[\phi_{Signal}(x,y,t_k)+\theta_k]-\\ \sin[\phi_{Signal}(x,y,t_l)+\theta_l]\end{array}\right\}} \quad (14)$$

In Equation (14) immediately above, all of the speckle noise is in the terms proportional to $\cot\phi_N$. One thing which was not heretofore known in the art is that it is possible to dynamically vary the controlled phases $\theta_i$, $\theta_j$, $\theta_k$, $\theta_l$ so as to minimize the speckle noise. For the cases of very small signal phases, it is possible to make the speckle noise infinitesimally small, providing exquisite sensitivity to signal phases induced by time-varying loads.

The present system/method provides exquisite sensitivity to measure very small surface motions. Consider a target surface moving under continuously time-varying load such that two points on the target surface which are centered on a location (x,y) and which are separated by the shear distance move with a time-varying relative amplitude $\phi(x,y,t)$ which is a small fraction (for example, 1/10th) of the wavelength of the laser radiation. Specklegram pixels corresponding to point (x,y) will also have a speckle noise phase $\phi_N$ which is random. For four specklegrams s1, s2, s3 and s4 acquired respectively at different/sequential times $t_1$, $t_2$, $t_3$ and $t_4$ with respective phase-modulations of $\theta_1=0$ radians, $\theta_2=+2\pi/3$ radians, $\theta_3=+4\pi/3$ radians and $\theta_4=0$ radians (or, equivalently, $\theta_4=2\pi$ radians) relative to the laser wavelength, then the output $Shear_{PR\_1}$ of the algorithm:

$$Shear_{PR\_1} = \frac{[(s4)-(s1)]}{[(s2)-(s3)]} \text{ yields:} \quad (15)$$

$$Shear_{PR\_1} \approx \frac{\cot\phi_N\left\{\begin{array}{c}\cos\theta_4-\\ \cos\theta_1\end{array}\right\} - \left\{\begin{array}{c}\phi_{Signal}(t_4)\cos\theta_4-\\ \phi_{Signal}(t_1)\cos\theta_1 - \sin\theta_4 + \sin\theta_1\end{array}\right\}}{\cot\phi_N\left\{\begin{array}{c}\cos\theta_3-\\ \cos\theta_2\end{array}\right\} - \left\{\begin{array}{c}\phi_{Signal}(t_3)\cos\theta_3-\\ \phi_{Signal}(t_2)\cos\theta_2 - \sin\theta_3 + \sin\theta_2\end{array}\right\}}$$

$$\approx \frac{\{\phi_{Signal}(x,y,t_4) - \phi_{Signal}(x,y,t_1)\}}{\{\sin\theta_2 - \sin\theta_3\}}$$

$$= \frac{1}{2\sqrt{3}}\{\phi_{Signal}(x,y,t_4) - \phi_{Signal}(x,y,t_1)\}.$$

Those skilled in the art will recognize that $Shear_{PR\_1}$ is directly proportional to the surface changes between the measurement times $t_1$ and $t_4$, and that the scale factor $$\frac{1}{2\sqrt{3}}$$

is immaterial—the output of the algorithm can be scaled to whatever units are convenient—such as waves, radians, or meters of ground surface motion or target surface motion.

The rules for selecting the phase steps of the $Shear_{PR\_1}$ algorithm are as follows: $(\cos \theta_1 = \cos \theta_4)$, $(\cos \theta_2 = \cos \theta_3)$, $(\sin \theta_2 \neq \sin \theta_3)$. Moreover, the phase steps between the laser beams and specklegrams s1, s2, s3, s4 do not need to all be equal. In particular, the phase step or difference between the phase of the second laser beam/specklegram s2 and the third laser beam/specklegram s3 may differ from the phase step or difference between the phase of the first laser beam/specklegram s1 and the second laser beam/specklegram s2, and may also differ from the phase step or difference between the third laser beam/specklegram s3 and the fourth laser beam/specklegram s4. This may alternately be stated that phase $\theta_2$ and phase $\theta_3$ define therebetween a first phase step or phase difference; and at least one of: (a) phase $\theta_1$ and phase $\theta_2$ define therebetween a phase step or phase difference which is different from the first phase step or phase difference; and (b) phase $\theta_3$ and phase $\theta_4$ define therebetween a phase step or phase difference different from the first phase step or phase difference.

The phase-resolved processing may be applied continuously and may be applied in an overlapping manner, for example computing $Shear_{PR\_1}$ for a first set of four shots with phases 0, $+2\pi/3$, $+4\pi/3$ and 0 radians, then for a second set of four shots with phases $+2\pi/3$, $+4\pi/3$, 0 and $+2\pi/3$ radians, then for a third set of four shots with phases $+4\pi/3$, 0, $+2\pi/3$ and $+4\pi/3$ radians, then for a fourth set of four shots with phases 0, $+2\pi/3$, $+4\pi/3$ and 0 radians, etc., yielding a continuous movie of the surface motion. The first set of four shots may also be expressed, for example, as phase $\theta_1=0$, phase $\theta_2=+2\pi/3$, phase $\theta_3=+4\pi/3$ and phase $\theta_4=0$ radians; the second set of four shots may be expressed as phase $\theta_2=+2\pi/3$, phase $\theta_3=+4\pi/3$, phase $\theta_4=0$ and phase $\theta_5=+2\pi/3$ radians; the third set of four shots may be expressed as phase $\theta_3=+4\pi/3$, phase $\theta_4=0$, phase $\theta_5=+2\pi/3$ and phase $\theta_6=+4\pi/3$ radians; and the fourth set of four shots may be expressed as phase $\theta_4=0$, phase $\theta_5=+2\pi/3$, phase $\theta_6=+4\pi/3$ and phase $\theta_7=0$ radians. In this example, it is noted that the second set of four shots overlaps the first set of four shots; that the third set of four shots overlaps each of the first and second sets; and that the fourth set of four shots overlaps each of the first, second and third sets. More particularly, the first three shots of the second set with phases $+2\pi/3$ radians, $+4\pi/3$ radians and 0 radians are the same as the last three shots of the first set so that the second set overlaps the first set with an overlap of three common shots; the first three shots of the third set with phases $+4\pi/3$, 0 and $+2\pi/3$ radians are the same as the last three shots of the second set so that the third set overlaps the second set with an overlap of three common shots; the first two shots of the third set with phases $+4\pi/3$ and 0 radians are the same as the last two shots of the first set so that the third set overlaps the first set with an overlap of two common shots; the first three shots of the fourth set with phases 0, $+2\pi/3$, $+4\pi/3$ radians are the same as the last three shots of the third set so that the fourth set overlaps the third set with an overlap of three common shots; the first two shots of the fourth set with phases 0 and $+2\pi/3$ radians are the same as the last two shots of the second set so that the fourth set overlaps the second set with an overlap of two common shots; and the first shot of the fourth set with phase 0 radians is the same as the last shot of the first set so that the fourth set overlaps the first set with an overlap of one common shot. Of course, a fifth set of four shots in this pattern would similarly overlap the second, third and fourth sets while not overlapping the first set. Such a fifth set of four shots may be expressed as phase $\theta_5=+2\pi/3$, phase $\theta_6=+4\pi/3$, phase $\theta_7=0$ and phase $\theta_8=+2\pi/3$ radians. This or another pattern may repeat itself over and over again.

Figure 4A:
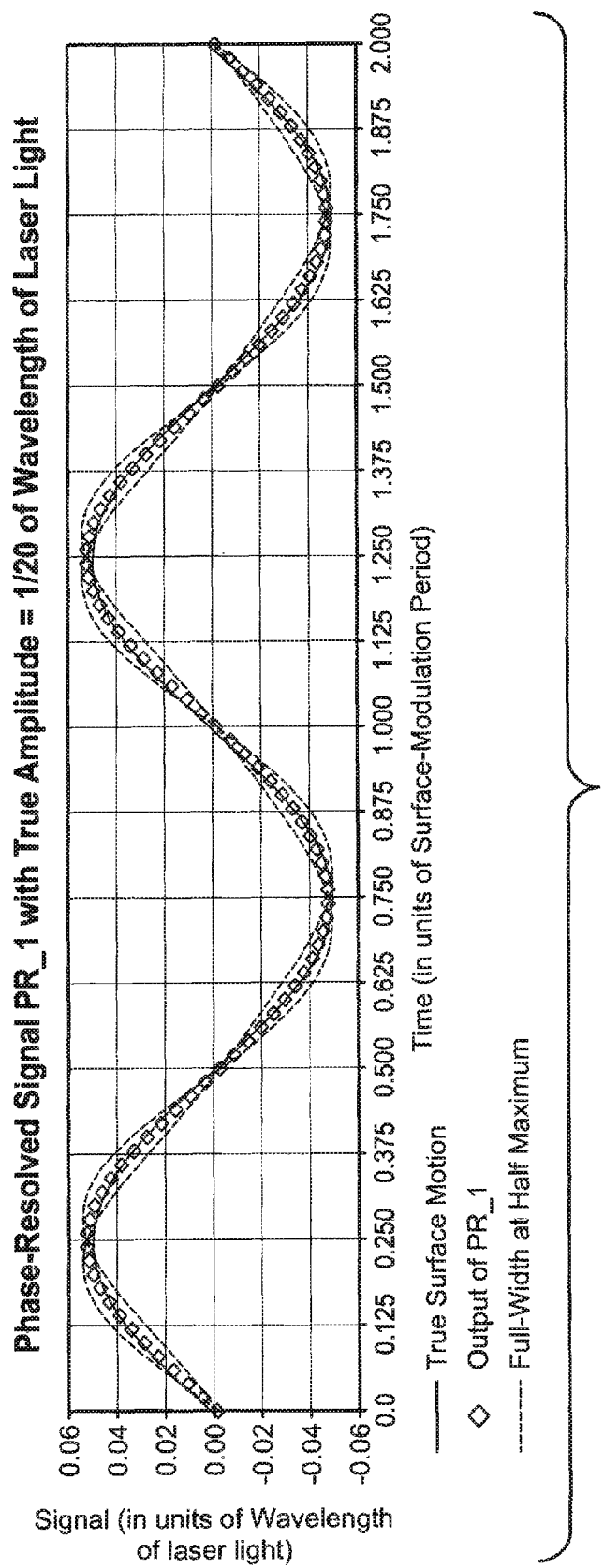
FIG. 4A is a graph showing output of a phase resolved algorithm compared to the true motion of a surface under time-varying load.
Figure 4B:
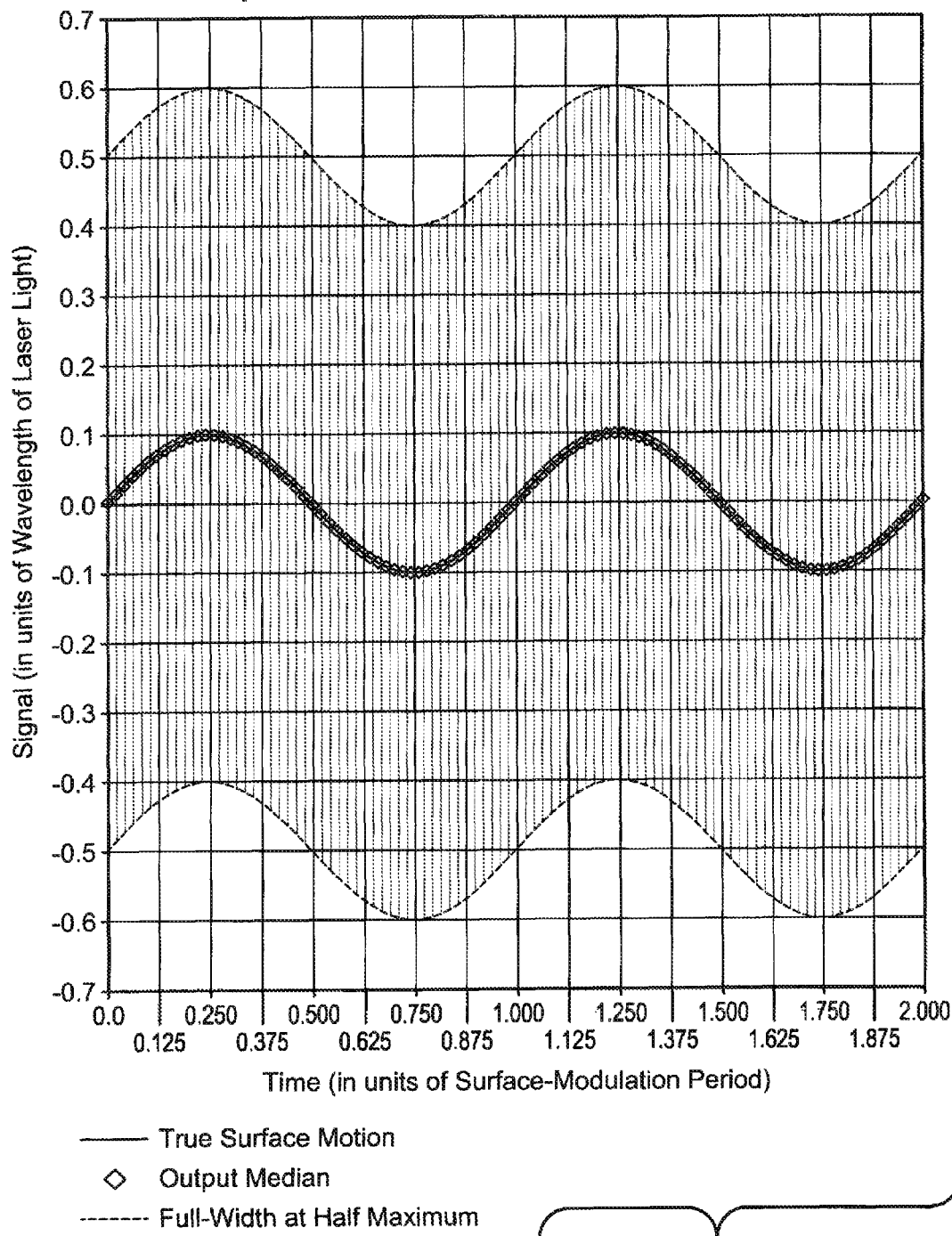
FIG. 4B is a graph similar to FIG. 4A showing prior art output of a non-phase resolved algorithm compared to the true motion of a surface under time-varying load.

An example of the time variation of a pixel of a movie such as that noted above is shown in FIG. 4A, which is contrasted with an analogous output in FIG. 4B if similarly attempted with prior art non-phase resolved shearography. The high fidelity of the estimate of the surface motion (such as shown in FIG. 4A) distinguishes the present method from the prior state of the art (such as shown in FIG. 4B), which adds an uncertainty amounting to a full wavelength of light to the phase measurement, requiring extensive post-processing with computationally intensive algorithms and reductions in image resolution. The present method may thus eliminate or vastly reduce this uncertainty and the noted extensive post-processing.

The error bars in the present method arise from the terms proportional to $\cos \phi_N$, in the general case for finite amplitudes, derived from Equation (14), which for $Shear_{PR\_1}$ is:

$$Shear_{PR\_1} = \frac{[(s4)-(s1)]}{[(s2)-(s3)]} = \frac{\cot\varphi_N C_{4,1} - S_{4,1}}{\cot\varphi_N C_{3,2} - S_{3,2}}, \text{ where:} \quad (16)$$

$$C_{4,1}(r) = \{\cos[\phi_{Signal}(t_4) + \theta_4] - \cos[\phi_{Signal}(t_1) + \theta_1]\} \quad (17)$$
$$C_{3,2}(r) = \{\cos[\phi_{Signal}(t_3) + \theta_3] - \cos[\phi_{Signal}(t_2) + \theta_2]\}$$
$$S_{4,1}(r) = \{\sin[\phi_{Signal}(t_4) + \theta_4] - \sin[\phi_{Signal}(t_1) + \theta_1]\}$$
$$S_{3,2}(r) = \{\sin[\phi_{Signal}(t_3) + \theta_3] - \sin[\phi_{Signal}(t_2) + \theta_2]\}$$

Because the speckle phase is a uniformly distributed random variable, the statistics of $Shear_{PR\_1}$ are of the Cauchy type, with a probability distribution having a well-defined median and full-width at half-maximum, which were computed for the results shown in FIGS. 4A and 4B.

FIG. 4A shows output of the phase resolved algorithm $Shear_{PR\_1}$, compared to the true motion of a surface under time-varying load. The solid line is the true motion, the diamond-shaped points represent the MLV (most-likely value) of $Shear_{PR\_1}$, and the dashed lines indicate the full-width at half maximum of the output of $Shear_{PR\_1}$. The inferred motion closely follows the true motion. Unlike non-phase resolved (NPR) shearography (FIG. 4B), the uncertainty represented by the dashed lines in FIG. 4A is much smaller than a wavelength of light. FIG. 4B shows the best-possible output of the current state of the art, which yields a phase estimate that includes the full amplitude of the random speckle noise $\phi_N$, which adds a light-wavelength of random uncertainty.

With sequences longer than four shots, the $2\pi/3$ phase steps could be replaced with finer steps, ($\pi/3$ for example), and the corresponding phase-resolved equations developed in a manner analogous to that outlined above in and related to Tables 5-8. In general, the optimal outputs have the form of ratios of sums of differences between specklegrams:

$$Shear_{PR\_Generic} = \frac{[(sj)-(si)]+[(sm)-(sn)]+\ldots}{[(sl)-(sk)]+[(sq)-(sp)]+\ldots}, \quad (18)$$

where i, j, k, l, m, n, p, q, . . . designate numbers in a sequence of specklegrams collected while viewing a scene of interest (Le, respectively first, second, third, fourth, fifth, sixth, seventh and eighth specklegrams and so forth).

Four-Shot Algorithm for "Peak Straddling" Condition

The generalization in Equation (18) also can be applied sequences of just three or four laser shots. In particular, for "peak straddling" cases (see Method 2 in Table 13 above) in which the loads at times $t_1$ and $t_4$ are equal to each other, and the loads at times $t_2$ and $t_3$ are also equal to each other, though different from the load at time $t_1$, the algorithm $Shear_{PR\_1}$ given in Equation (17) may yield an ambiguous result, even in the presence of rates of change of the signal phase. In that case, an alternative algorithm of the same form as Equation (18) unambiguously shows the effects of a varying load:

$$Shear_{PR\_Peak\_Straddling} = \frac{[(s2)-(s1)]+[(s2)-(s3)]+[(s2)-(s4)]}{[(s2)-(s1)]+[(s3)-(s4)]}. \quad (19)$$

Thus, computing both $Shear_{PR\_1}$ and $Shear_{PR\_Peak\_Straddling}$ give a means to always detect a signal phase cause by a varying load, without control of said load and without prior information regarding the temporal phase of the load. The application of Equation (19) is particularly useful in the peak-straddling case, but is not limited to said case.

Three-Shot Algorithm

Equation (19) also provides a means to extend the phase-resolved shearography method to sequences of just three laser shots. The rules for selecting the phase steps: (cos $\theta_1$=cos $\theta_4$), (cos $\theta_2$=cos $\theta_3$), (sin $\theta_2$≠sin $\theta_3$) allow for the selection ($\theta_1$=$\theta_4$). With this selection, it is clear that signal phases in the peak straddling case, (s1) and (s4) provide redundant information, since both the true signal phases and the interferometer phases are equal at times $t_1$ and $t_4$. Replacing (s4) with (s1) in Equation (19) then gives a third algorithm requiring just three laser shots to create a specklegram.

$$Shear_{PR\_3} = \frac{2[(s2)-(s1)]+[(s2)-(s3)]}{[(s2)-(s1)]+[(s3)-(s1)]}. \quad (20)$$

The rules for selecting the sequence of controlled phases $\theta_1$, $\theta_2$, $\theta_3$ . . . in the shearing interferometer are the same, except that the images are to be processed in groups of three instead of four to yield each shearogram. More particularly, where the three laser shots (shots 1, 2 and 3) are part of a longer sequence, for example, of laser shots 1, 2, 3, 4, 5, 6, 7, . . . , the same rules apply except that the specklegrams are derived from three laser shots each. For instance, a first specklegram may be derived from or based on laser shots 1, 2 and 3; a second specklegram may be derived from or based on laser shots 2, 3 and 4; a third specklegram may be derived from or based on laser shots 3, 4 and 5; a fourth specklegram may be derived from or based on laser shots 4, 5 and 6; a fifth specklegram may be derived from or based on laser shots 5, 6 and 7, and so on. This processing of specklegrams may create a movie of the moving target surface. On the other hand, where only three laser shots are used, the first laser shot can be acquired at any convenient relative phase, and the rules for selecting the phase are (cos $\theta_2$=cos $\theta_3$), (sin $\theta_2$≠sin $\theta_3$). Like Equation (19), Equation (20) can be employed generally for any time-varying load, and is not confined to the peak-straddling load condition.

As noted, the method uses at least three (and preferably four) interferometric images or specklegrams with a controlled phase difference between images. With the use of a pulsed laser, the term "shot" for each image may be used. The data do not have to be collected in "bursts" of three or four shots—many images can be collected over an extended time and processed to yield a movie of the target surface motions, as noted above. Because the phase-resolved method captures both the magnitude and the sign of the surface motion, the speeds and propagation directions of the vibrations can be determined. Further, the data collection can be asynchronous with the surface motions—there is no need to time the laser pulses to match the phases of the target surface motions. The ability to image microscopic vibrations which are not under the control of the operator as said vibrations propagate across a surface is a distinctive capability, allowing for fast collection of surface vibrations arising from a variety of causes.

A continuous-wave laser is also usable, if the power collected over a short camera-exposure time is high enough to provide enough photoelectrons per pixel. Here, "short exposure time" means a time much less than the minimum of: (a) the surface-vibration periods of interest, or (b) the scintillation correlation time of the medium through which the laser is passing (typically several milliseconds for air).

Tests

An experimental verification of phase resolved shearography using a circular membrane or drumhead target was conducted. The membrane target was assembled from a 12" by 18" plate (thinned to 0.02" over two 3" diameter regions) and a micrometer. The micrometer could be adjusted to push against one of the thinned regions of the plate producing variable amounts of surface distortion. Two tests were conducted using this target, a large amplitude test (in which the membrane was distorted by an amplitude large enough to generate multiple ring pairs within the shearogram) and a small amplitude test (in which the membrane was distorted by a smaller amplitude, generating only a single ring pair within the shearogram). For each of these tests, a phase resolved (PR) shearogram and a non-phase resolved (NPR) shearogram were generated. Each test consisted of collecting a series of four specklegram images of the front of the plate as the distortion was adjusted from zero to some maximum displacement amplitude in four equal steps. The large amplitude test indicated that the PR shearography method produced shearograms with positive and negative fringe values, resolving both the magnitude and sign of the slope changes. The small amplitude test provided similar results, illustrating that even at low amplitudes, the PR shearography was able to resolve the magnitude and the sign of the slope changes. The tests emphasize superior performance of PR versus NPR shearography for resolving positive versus negative surface-slope changes. The PR shearography also proved to have a much improved signal-to-noise ratio (SNR), for example, a 9×SNR improvement. Further, cross sections of PR and NPR shearograms were compared in a large amplitude test, and were likewise compared in a small amplitude test. In both cases, the fringe contrast was significantly larger for PR shearograms than for NPR shearograms. With PR shearography, the fringes are clearer and easier to resolve at all amplitudes, phase unwrapping is unambiguous, and the SNR is about nine times higher than in NPR shearography.

Those skilled in the art will appreciate that while the present method is useful for remote detection of buried/underground objects or structures, it may also be used in a variety of other situations. For instance, other uses include non-contact sensing of acousto-seismic vibrations for other applications including investigation of properties to the transmitting medium. Since the technique is sensitive to extremely small surface amplitude changes, there are likely many other applications, including the real-time measurement of small surface changes as might be helpful in the development of oxidation layers or biofilms, which may be represented by target surface 15. Although the method was discussed primarily with respect to using shearography apparatus 1 while moving relative to the target on a moving platform, shearography apparatus 1 may also be used while stationary, and for instance, may be so used to detect leaking underground pipes or the digging or building of a tunnel or underground room.

The present shearography may be used to ascertain or identify various subsurface structures, including the underground structures previously noted as well as any subsurface structure beneath a given target surface. The present shearography system and process may be used in the medical field, for instance, including non-contact monitoring of respiration, non-contact cardiograms and non-contact ultrasound imaging. There may be many other uses—any phenomenon (such as sound) which can convey information from inside a body to make a physical change in the surface might be exploited. In such cases, target surface 15 may, for instance, represent a skin surface of a person (or animal) undergoing the respective shearography procedure, which would thus allow via shearograms for the determining or ascertaining subsurface structures or movement within a human body (or animal).

As noted further above, the prior art phase stepped shearography required that for a given set of specklegrams used to produce a shearogram, the loading conditions must be constant for the specklegrams in that given set. In contrast, the present method(s) allows a shearogram to be produced from a set of specklegrams for which the loads are different.

In addition, while prior art phase stepped shearography required that two shearograms be produced and compared to one another to discern surface changes, the present shearography allows for ascertaining surface changes of a target surface with a single shearogram. Additional shearograms in the present method may thus be used to show additional surface changes over time which allow for the creation of a movie of the surface changes which may be an essentially real time movie of those surface changes, and thus an essentially real time movie of subsurface structures or subsurface movements below the target surface. The method(s) herein vastly reduces or eliminates the "unwrapping" processing required in prior art shearography.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A method comprising the steps of:
reflecting sequentially off of a target surface first, second and third laser beams so that the first laser beam is reflected off of the target surface when the target surface is under a first load to produce a first reflected laser beam image; the second laser beam is reflected off of the target surface when the target surface is under a second load to produce a second reflected laser beam image; and the third laser beam is reflected off of the target surface when the target surface is under a third load to produce a third reflected laser beam image; wherein at least one of the first, second and third loads is different from another one of the first, second and third loads;
phase stepping the first, second and third reflected laser beam images with a shearing interferometer to respective phases $\theta_1$, $\theta_2$ and $\theta_3$ of a laser beam wavelength;
collecting with shearography equipment first, second and third specklegrams of the target surface based respectively on the first, second and third reflected laser beam images; and
comparing the first, second and third specklegrams to one another to produce a first shearogram to ascertain surface changes of the target surface.

2. The method of claim 1 wherein the step of reflecting comprises reflecting sequentially off of the target surface the first, second and third laser beams and a fourth laser beam so that the fourth laser beam is reflected off of the target surface when the target surface is under a fourth load which is different from each of the first, second and third loads to produce a fourth reflected laser beam image;
the step of phase stepping comprises phase stepping the first, second, third and fourth reflected laser beam images with the shearing interferometer to respective phases $\theta_1$, $\theta_2$, $\theta_3$ and $\theta_4$ of the laser beam wavelength;
the step of collecting comprises collecting with the shearography equipment a fourth specklegram of the target surface based on the fourth reflected laser beam image; and
the step of comparing comprises comparing the first, second, third and fourth specklegrams to one another to produce the first shearogram.

3. The method of claim 2 wherein the first shearogram is based on a phase resolved shearogram equation $Shear_{PR\_1}$ expressed as a ratio of differences of specklegrams:

$$Shear_{PR\_1} = \frac{[(s4)-(s1)]}{[(s2)-(s3)]}$$

wherein the first specklegram is represented by (s1), the second specklegram is represented by (s2), the third specklegram is represented by (s3) and the fourth specklegram is represented by (s4); and wherein $\cos\theta_1 = \cos\theta_4$ and $\cos\theta_2 = \cos\theta_3$.

4. The method of claim 3 wherein $\sin\theta_2$ is not equal to $\sin\theta_3$.

5. The method of claim 4 wherein phase $\theta_2$ and phase $\theta_3$ define therebetween a first phase step; and at least one of: (a) phase $\theta_1$ and phase $\theta_2$ define therebetween a phase step which is different from the first phase step; and (b) phase $\theta_3$ and phase $\theta_4$ define therebetween a phase step different from the first phase step.

6. The method of claim 2 wherein the first shearogram is based on a phase resolved shearogram equation $Shear_{PR\_Peak\_Straddling}$ expressed as a ratio of differences of specklegrams:

$$Shear_{PR\_Peak\_Straddling} = \frac{[(s2)-(s1)] + [(s2)-(s3)] + [(s2)-(s4)]}{[(s2)-(s1)] + [(s3)-(s4)]}$$

wherein the first specklegram is represented by (s1), the second specklegram is represented by (s2), the third specklegram is represented by (s3) and the fourth specklegram is represented by (s4); and wherein cos $\theta_1$=cos $\theta_4$ and cos $\theta_2$=cos $\theta_3$.

7. The method of claim 1 further comprising the step of: producing a second shearogram to ascertain surface changes of the target surface, wherein the second shearogram is based on a fourth specklegram of the target surface and one or more of the first, second and third specklegrams.

8. The method of claim 7 wherein the step of reflecting comprises reflecting sequentially off of the target surface the first, second and third laser beams and a fourth laser beam so that the fourth laser beam is reflected off of the target surface when the target surface is under a fourth load which is different from each of the first, second and third loads to produce a fourth reflected laser beam image;
the step of phase stepping comprises phase stepping the first, second, third and fourth reflected laser beam images with the shearing interferometer to respective phases $\theta_1$, $\theta_2$, $\theta_3$ and $\theta_4$ of the laser beam wavelength;
the step of collecting comprises collecting with the shearography equipment the fourth specklegram based on the fourth reflected laser beam image; and
the step of producing the second shearogram comprises comparing the fourth specklegram and the one or more of the first, second and third specklegrams to one another.

9. The method of claim 7 wherein the step of reflecting comprises reflecting sequentially off of the target surface the first, second and third laser beams and fourth and fifth laser beams so that the fourth laser beam is reflected off of the target surface when the target surface is under a fourth load which is different from each of the first, second and third loads to produce a fourth reflected laser beam image; and the fifth laser beam is reflected off of the target surface when the target surface is under a fifth load which is different from each of the first, second, third and fourth loads to produce a fifth reflected laser beam image;
the step of phase stepping comprises phase stepping the first, second, third, fourth and fifth reflected laser beam images with the shearing interferometer to respective phases $\theta_1$, $\theta_2$, $\theta_3$, $\theta_4$, and $\theta_5$ of the laser beam wavelength;
the step of collecting comprises collecting with the shearography equipment fourth and fifth specklegrams of the target surface respectively based on the fourth and fifth reflected laser beam images;
the step of comparing comprises comparing the first, second, third and fourth specklegrams to one another to produce the first shearogram; and
the step of producing comprises producing the second shearogram based on the second, third, fourth and fifth specklegrams.

10. The method of claim 7 further comprising the step of: producing a third shearogram to ascertain surface changes of the target surface, wherein the third shearogram is based on a fifth specklegram of the target surface and one or more of the first, second, third and fourth specklegrams.

11. The method of claim 1 wherein the steps of reflecting, phase stepping, collecting and comparing occur during movement of the shearography equipment relative to the target surface.

12. The method of claim 11 wherein the steps of reflecting, phase stepping, collecting and comparing occur during movement relative to the target surface of a moving platform which carries the shearography equipment.

13. The method of claim 12 wherein the moving platform is one of an aircraft, watercraft, spacecraft, land motor vehicle and a handheld device.

14. The method of claim 1 wherein the surface changes of the target area are indicative of a subsurface structure.

15. The method of claim 1 wherein the first shearogram is based on a phase resolved shearogram equation $Shear_{PR\_3}$ expressed as a ratio of differences of specklegrams:

$$Shear_{PR\_3} = \frac{2[(s2)-(s1)] + [(s2)-(s3)]}{[(s2)-(s1)] + [(s3)-(s1)]}$$

wherein the first specklegram is represented by (s1), the second specklegram is represented by (s2) and the third specklegram is represented by (s3); wherein cos $\theta_2$=cos $\theta_3$; and wherein sin $\theta_2$ is not to sin $\theta_3$.

16. A method comprising the steps of:
reflecting sequentially off of a target surface first, second, third and fourth laser beams to respectively produce first, second, third and fourth reflected laser beam images;
phase stepping the first, second, third and fourth reflected laser beam images with a shearing interferometer to respective phases $\theta_1$, $\theta_2$, $\theta_3$ and $\theta_4$ of a laser beam wavelength, wherein cos $\theta_1$=cos $\theta_4$ and cos $\theta_2$=cos $\theta_3$;
collecting with shearography equipment first, second, third and fourth specklegrams of the target surface based respectively on the first, second, third and fourth reflected laser beam images; and
comparing the first, second, third and fourth specklegrams to one another to produce a shearogram to ascertain surface changes of the target surface;
wherein the shearogram is based on a phase resolved shearogram equation $Shear_{PR\_1}$ expressed as a ratio of differences of specklegrams:

$$Shear_{PR\_1} = \frac{[(s4)-(s1)]}{[(s2)-(s3)]}$$

wherein the first specklegram is represented by (s1), the second specklegram is represented by (s2), the third specklegram is represented by (s3) and the fourth specklegram is represented by (s4).

17. A method comprising the steps of:
reflecting sequentially off of a target surface first, second, third and fourth laser beams to respectively produce first, second, third and fourth reflected laser beam images;
phase stepping the first, second, third and fourth reflected laser beam images with a shearing interferometer to respective phases $\theta_1$, $\theta_2$, $\theta_3$ and $\theta_4$ of a laser beam wavelength;

collecting with shearography equipment first, second, third and fourth specklegrams of the target surface based respectively on the first, second, third and fourth reflected laser beam images;

comparing the first, second and third specklegrams to one another to produce a first shearogram to ascertain surface changes of the target surface; and comparing the fourth specklegram and at least two of the first, second and third specklegrams to one another to produce a second shearogram to ascertain surface changes of the target surface.

18. The method of claim 17 wherein the first shearogram is based on a phase resolved shearogram equation $Shear_{PR\_1}$ expressed as a ratio of differences of specklegrams:

$$Shear_{PR\_1} = \frac{[(s4) - (s1)]}{[(s2) - (s3)]}$$

wherein the first specklegram is represented by (s1), the second specklegram is represented by (s2), the third specklegram is represented by (s3) and the fourth specklegram is represented by (s4); and wherein $\cos \theta_1 = \cos \theta_4$ and $\cos \theta_2 = \cos \theta_3$.

19. The method of claim 17 wherein the first shearogram is based on a phase resolved shearogram equation $Shear_{PR\_Peak\_Straddling}$ expressed as a ratio of differences of specklegrams:

$$Shear_{PR\_Peak\_Straddling} = \frac{[(s2) - (s1)] + [(s2) - (s3)] + [(s2) - (s4)]}{[(s2) - (s1)] + [(s3) - (s4)]}$$

wherein the first specklegram is represented by (s1), the second specklegram is represented by (s2), the third specklegram is represented by (s3) and the fourth specklegram is represented by (s4); and wherein $\cos \theta_1 = \cos \theta_4$ and $\cos \theta_2 = \cos \theta_3$.

* * * * *